Patented May 31, 1932

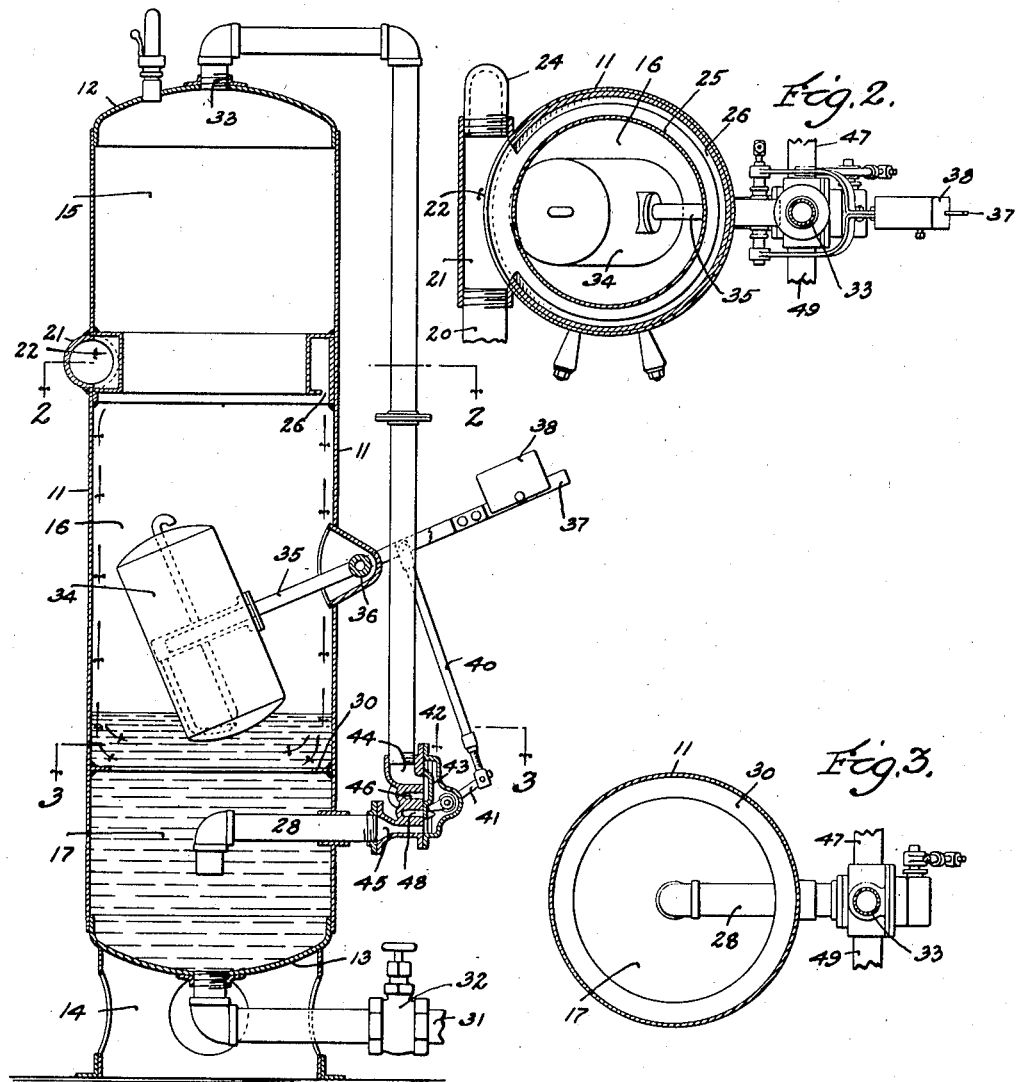

1,860,896

UNITED STATES PATENT OFFICE

WILLIAM McGRAW, OF LOS ANGELES, AND ROYAL C. ADAMS, OF SAN GABRIEL, CALIFORNIA, ASSIGNORS TO TRUMBLE GAS TRAP COMPANY, A CO-PARTNERSHIP CONSISTING OF FRANCIS M. TOWNSEND, A. J. GUTZLER, AND MILON J. TRUMBLE

PROCESS AND APPARATUS FOR SEPARATING CRUDE PETROLEUM AND NATURAL GAS

Application filed April 11, 1928. Serial No. 269,272.

Our invention relates to the art of producing petroleum oil, and particularly to the separation of natural gas from the oil in what is commonly termed a gas trap which receives the mixture of oil and gas discharged from the well through suitable piping, the natural gas from the trap being discharged into a pipe line and the oil discharged into run down tanks.
In order to effect a complete separation of oil and gas as it comes from the well, it is preferable to subject the oil to a thinning or spreading action within a closed receptacle over a surface adapted to allow the oil to flow downwardly thereon in a thin sheet or film whereby the oil resistance to the escape of gas from the body is diminished, and then directing the oil, thus deprived of the greater portion of gas, into a horizontal path on the top of a body of oil contained in a settling chamber, which allows the oil containing gas to be uppermost of the stratifying or settling body of oil, thereby permitting the gas contained therein to escape from the upper surface of the body of oil.

The body of oil in the settling chamber is maintained in a quiescent condition and the fresh oil containing gas in solution or in mixture coming on top of this body gives up its gas, thereby increasing the gravity of the oil which settles downwardly until it reaches the level of the outlet oil pipe by which it is withdrawn from the settling chamber. Furthermore, the deflecting of the oil and gas at a point near the top of the oil body in the settling chamber prevents the oil from flowing downwardly into the body of oil in the settling chamber, which would result in agitating the oil and mixing the entrained gas with the entire body of oil in the settling chamber.

The principal object of our invention is to provide a method or process of separating natural gas from petroleum oil as it comes from the well, whereby a complete separation of the gas from the oil is made in a single operation, such method embracing the liberation of the mixture of oil and gas from the well into a chamber, releasing the pressure thereon and spreading the oil in a film or sheet as it flows downwardly in the chamber and diverting the downwardly flowing oil in substantially horizontal direction in the top of an accumulated body of oil in a settling chamber, whereby any remaining gas in the oil is liberated from the oil at the surface of the body of oil.

Another object of our invention is to provide, in a gas trap of the class described, means for allowing the accumulation of a body of oil in a settling chamber and the distribution of incoming oil across the upper surface of the body of oil in such a manner as to permit the ready separation of gas from the incoming oil at the surface of the body of oil.

To attain these objects, we have discovered that it is desirable to maintain a quiet body of oil at and about the oil discharge pipe, providing means whereby the incoming oil is prevented from disturbing the quiet body of oil in the bottom of the trap and also from forming currents or direct flow to the outlet, thereby preventing gas carried by the oil from passing through the oil discharge pipe.

Other objects of our invention, such as simple and efficient oil distributing means, and oil and gas outlet controlling mechanism, will appear more fully hereinafter in the following description and accompanying drawings.

Referring to the drawings, which are for illustrative purposes,

Fig. 1 is a vertical sectional view of a device embodying a form of our invention.

Fig. 2 is a sectional plan view on line 2—2 of Fig. 1, and

Fig. 3 is a sectional plan view on line 3—3 of Fig. 1.

Describing more specifically the form of our invention shown in the drawings, 11 designates a vertical cylindrical shell or receptacle, having a head 12 and bottom 13, the bottom being seated upon a cylindrical base 14. The shell 11 forms a chamber which may be designated as consisting of three parts, that is, the upper portion comprises a gas chamber 15, the central portion a separating chamber 16 and the lower portion a settling chamber 17.

A mixture of oil and gas is delivered from the well, usually under pressure, from a pipe 20 into one end of a header 21, thence into the trap through an opening 22 formed in the side of the shell 11. The pipe 20 from the well may be connected to either end of the header 21, as may suit convenience of location of the trap with respect to the well, the opposite end to the pipe connection being closed by means of a plug 24.

The oil and gas mixture is delivered into the trap longitudinally with a circular trough 25 which discharges the mixture against the inner wall of the trap through a circular outlet 26 adjacent the inner wall of the trap. The oil so delivered runs downwardly on the inner wall of the trap to the bottom of the separating chamber 16, the oil rolling over on the inner surface of the trap, thereby releasing most of the gas carried therein.

The oil collects in the settling chamber 17 and rises to a point therein above the down turned inner end of an oil outlet pipe 28, which is submerged in the oil as hereinafter more fully set forth. The flow of oil down the walls of the trap is by gravity and as it strikes the body of oil in the trap causes a churning of the upper portion of the oil body, and for the purpose of preventing the down flowing current of oil from forming currents into the body of oil, a circular baffle plate 30 is provided, extending inwardly from the walls of the trap a sufficient distance to cause the down flowing current or stream of oil to move inwardly in the upper portion of the body of oil in the separator, or at the upper surface of the same as indicated by arrows in Fig. 1.

By this construction the agitation in the body of oil in the trap is confined to or near its upper surface, thereby liberating any remaining gas in the oil, and permitting the oil to settle into the settling chamber, so that clean oil is discharged through the pipe 28, any water or sand settling to the bottom of the chamber 17, where, upon accumulation, it may be drawn off through pipe 31, a valve 32 being provided in the pipe 31 for this purpose. From the separating chamber 16, the gas collects in the gas chamber 15 of the separator and is discharged therefrom through a gas outlet pipe 33.

Means are provided for the automatic control of the discharge of gas and oil from the separator, which consists of a float 34, supported on an arm 35, connected to a shaft 36, rotatably mounted in the side wall of the separator. Attached to the shaft 36 is a yoke arm 37, provided with a weight 38. Pivotally connected to the arm 37 is a rod 40, connected at its other end to an operating arm 41 of a valve 42, which has a plate 43 slidable over ports in the valve.

The gas outlet pipe 33 is connected to the valve 42 and is in open communication with a port 44, and the oil outlet pipe 28 is in open communication with a port 45.

46 designates a port connected with a gas discharge pipe 47, and 48 designates a port connected with an oil discharge pipe 49. With the parts of the valve in the position shown in Fig. 1, the ports 44 and 46 are in open communication, so that gas is being discharged from the separator, the oil port 48 being closed so that oil will accumulate in the separator until the float rises a sufficient distance to move the plate 43 through the medium of the connections above described to close the gas port and open the oil port of the valve.

By the automatic regulation of the oil and gas discharge from the separator, a body of oil is retained in the separator sufficient to submerge, at all times, the oil outlet, thereby preventing free gas from passing out through the oil discharge pipe, and by the arrangement of the baffle 30 the body of oil is not materially disturbed to any depth, nor does the downflowing oil in the separator flow directly to the oil outlet pipe and carry out through such pipe any appreciable amount of gas.

We claim as our invention:

1. An oil and natural gas separator, comprising a receptacle, means for discharging a mixture of oil and gas into said receptacle, means for directing said mixture against the inner wall of said receptacle and causing it to flow downwardly thereover, means for maintaining a body of oil in said receptacle, means for directing the downwardly flowing oil away from the wall of said receptacle below the upper surface of oil therein, and separate outlet means for the separated oil and gas.

2. An oil and natural gas separator, comprising a receptacle, means for discharging a mixture of oil and gas into said receptacle, means for directing said mixture against the inner wall of said receptacle and causing it to flow downwardly thereover, means for maintaining a body of oil in said receptacle, means for directing the downwardly flowing oil away from the wall of said receptacle in the upper strata of oil therein, and separate outlet means for the separated oil and gas, said directing means consisting of a member extending inwardly from the wall of said receptacle.

3. An oil and gas separator comprising a receptacle having a settling chamber therein, means for introducing a mixture of oil and gas into said receptacle, means for flowing said mixture downwardly on the inner walls of said receptacle, separate oil and gas outlets for said receptacle, means for maintaining a body of oil in said settling chamber to submerge said oil outlet, and means above said oil outlet for diverting the downward flow of the mixture in said body of oil to a substantially horizontal flow.

4. An oil and gas separator comprising a receptacle having a settling chamber therein adapted to contain a body of oil, means for delivering a mixture of oil and gas to said receptacle, a trough in said receptacle for receiving such mixture and spreading such mixture on the walls of said receptacle to flow downwardly thereover, means for interrupting the downwardly flowing mixture within said body of oil, and outlet means for the separated oil and gas.

5. An oil and gas separator comprising a receptacle having a settling chamber therein adapted to contain a body of oil, means for delivering a mixture of oil and gas to said receptacle, a trough in said receptacle for receiving such mixture and spreading such mixture on the walls of said receptacle to flow downwardly thereover, means for interrupting the downwardly flowing mixture beneath the surface of said body of oil, outlet means for the separated oil and gas, and means for dependably controlling the discharge of oil and gas from the receptacle.

6. An oil and gas separator comprising a receptacle having a settling chamber therein adapted to contain a body of oil, means for delivering a mixture of oil and gas to said receptacle, a trough in said receptacle for receiving such mixture and spreading such mixture on the walls of said receptacle to flow downwardly thereover, means for interrupting the downwardly flowing mixture in the upper level of said body of oil, outlet means for the separated oil and gas, and means for dependably controlling the discharge of oil and gas from the receptacle, said controlling means comprising valve means on said oil and gas outlets, a float in said receptacle, and means operably connecting said float and said valve means.

7. An oil and gas separator comprising a receptacle having a settling chamber therein adapted to contain a body of oil, means for delivering a mixture of oil and gas to said receptacle, a trough in said receptacle for receiving such mixture and spreading such mixture on the walls of said receptacle to flow downwardly thereover, means for interrupting the downwardly flowing mixture and diverting the same across said body of oil, and outlet means for the separated oil and gas, said oil delivering means being arranged to deliver the oil and gas mixture tangentially into said trough.

8. The method of separating natural gas from mixtures of petroleum oil and natural gas flowing from wells under pressure which consists in: causing the mixture to flow downwardly on the inner wall of a container to effect a gas liberating action; continuing said gas liberating action by causing the downwardly flowing mixture to flow horizontally across the surface of a body of oil; and separately removing from the container separated gas and oil.

In testimony whereof, the said WILLIAM McGRAW and ROYAL C. ADAMS have hereunto set their hands at Los Angeles, California, this 7th day of April, 1928.

WILLIAM McGRAW.
ROYAL C. ADAMS.